US011141964B2

(12) United States Patent
Nagaoka et al.

(10) Patent No.: US 11,141,964 B2
(45) Date of Patent: Oct. 12, 2021

(54) RESIN FILM FOR VACUUM FORMING

(71) Applicant: DENKA COMPANY LIMITED, Tokyo (JP)

(72) Inventors: Kouta Nagaoka, Isesaki (JP); Keiji Takano, Isesaki (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 16/647,776

(22) PCT Filed: Sep. 21, 2018

(86) PCT No.: PCT/JP2018/035168
§ 371 (c)(1),
(2) Date: Mar. 16, 2020

(87) PCT Pub. No.: WO2019/059369
PCT Pub. Date: Mar. 28, 2019

(65) Prior Publication Data
US 2020/0230932 A1 Jul. 23, 2020

(30) Foreign Application Priority Data
Sep. 22, 2017 (JP) .............................. JP2017-182394

(51) Int. Cl.
B32B 27/32 (2006.01)
B32B 27/08 (2006.01)
B29C 51/10 (2006.01)
B29C 51/14 (2006.01)
B32B 27/18 (2006.01)
B32B 27/30 (2006.01)
B32B 27/36 (2006.01)
B32B 38/18 (2006.01)

(52) U.S. Cl.
CPC ............ *B32B 27/322* (2013.01); *B29C 51/10* (2013.01); *B29C 51/14* (2013.01); *B32B 27/08* (2013.01); *B32B 27/18* (2013.01); *B32B 27/304* (2013.01); *B32B 27/308* (2013.01); *B32B 27/365* (2013.01); *B32B 38/1858* (2013.01); *B32B 2307/40* (2013.01); *B32B 2307/71* (2013.01); *B32B 2307/734* (2013.01); *B32B 2457/00* (2013.01); *B32B 2605/08* (2013.01)

(58) Field of Classification Search
None
See application file for complete search history.

(56) References Cited

U.S. PATENT DOCUMENTS

| 3,859,090 A | 1/1975 | Yoerger et al. |
| 5,256,472 A | 10/1993 | Moriya et al. |
| 5,725,712 A | 3/1998 | Spain et al. |
| 2004/0086721 A1 | 5/2004 | Bonnet et al. |
| 2005/0187354 A1 | 8/2005 | Bonnet et al. |
| 2011/0315189 A1 | 12/2011 | Ge et al. |
| 2013/0202847 A1 | 8/2013 | Konokawa et al. |
| 2017/0204297 A1 | 7/2017 | Hasumi et al. |
| 2017/0232717 A1 | 8/2017 | Sanefuji et al. |
| 2018/0002573 A1 | 1/2018 | Kawakita et al. |

FOREIGN PATENT DOCUMENTS

| CN | 1478645 A | 3/2004 |
| CN | 1721286 A | 1/2006 |
| CN | 105246687 A | 1/2016 |
| CN | 106687545 A | 5/2017 |
| EP | 1566408 A1 | 8/2005 |
| EP | 2756950 A1 | 7/2014 |
| EP | 3170874 A1 | 5/2017 |
| EP | 3181355 A1 | 6/2017 |
| JP | S61-008349 A | 1/1986 |
| JP | H2-030528 A | 1/1990 |
| JP | 2002-067137 A | 3/2002 |
| JP | 2009-013418 A | 1/2009 |
| WO | WO 94/03337 A2 | 2/1994 |
| WO | WO 2016/010013 A1 | 1/2016 |
| WO | WO 2016/024592 A1 | 2/2016 |
| WO | WO 2016/121868 A1 | 8/2016 |

OTHER PUBLICATIONS

China National Intellectual Property Administration, Office Action in Chinese Patent Application No. 201880059362.4 (dated Apr. 16, 2021).
European Patent Office, Supplementary European Search Report in EP Patent Application No. 18857628.4 (dated Sep. 29, 2020).

(Continued)

*Primary Examiner* — Ramsey Zacharia
(74) *Attorney, Agent, or Firm* — Leydig, Voit & Mayer, Ltd.

(57) ABSTRACT

Provided is a fluorine-based resin multilayer film for vacuum forming which does not cause wrinkles and the like when a three-dimensional surface decoration method is applied. The fluorine-based resin multilayer film for vacuum forming includes a front surface layer containing 60% by mass to 85% by mass of a vinylidene fluoride-based resin and 40% by mass to 15% by mass of a methacrylate ester-based resin; and a back surface layer containing 0% by mass to 50% by mass of a vinylidene fluoride-based resin and 100% by mass to 50% by mass of a methacrylate ester-based resin, wherein the thermal dimensional change in a film flow direction when heated at 120° C. for 30 minutes, which is measured based on JIS K7133, is −15% to −2%.

12 Claims, No Drawings

(56) References Cited

OTHER PUBLICATIONS

Japan Patent Office, International Search Report in International Application No. PCT/JP2018/035168 (dated Oct. 16, 2018).
Japan Patent Office, International Written Opinion of the International Searching Authority in Application No. PCT/JP2018/035168 (dated Oct. 16, 2018).
International Bureau of WIPO, International Preliminary Report on Patentability in International Application No. PCT/JP2018/035168 (dated Apr. 2, 2020).

RESIN FILM FOR VACUUM FORMING

CROSS-REFERENCE TO RELATED APPLICATIONS

This patent application is the U.S. national phase of International Application No. PCT/JP2018/035168, filed on Sep. 21, 2018, which claims the benefit of Japanese Patent Application No. 2017-182394, filed Sep. 22, 2017, the disclosures of which are incorporated herein by reference in their entireties for all purposes.

TECHNICAL FIELD

The present invention relates to a resin film for vacuum forming.

BACKGROUND ART

A fluorine-based multilayer film is used in the outermost layer of a decorative film used for automobile interiors and exteriors or electric appliance parts for the purpose of imparting weather resistance or chemical resistance. For the fluorine-based multilayer film, a configuration is often employed such that the content of fluorine resin is increased in the front surface layer in order to enhance surface performance such as weather resistance and chemical resistance and the content of acrylic resin showing good compatibility with fluorine-based resin is increased in the back surface layer in order to improve the laminating property with other base materials such as a decorative layer.

Examples of conventional methods for attaching a resin film for Ruining such as the above decorative film to a formed body include a vacuum forming method, an in-mold forming method, and an insert forming method.

However, in conventional vacuum forming apparatus in which the resin film for forming is placed on the surface of the mold and softened by heating, the upper and lower sides of the mold are evacuated, air is pressure-injected only the upper side of the mold, and the pressure presses the resin film for forming against the mold to perform laminate forming, there is a problem that it is difficult to adjust the sagging of the resin film for forming to the original state.

In recent years, a three-dimensional surface decoration method has been developed. This method is also called a TOM method (Three dimension Overlay Method) and a three-dimensional surface coating method (hereinafter, referred to as a TOM method or TOM forming).

It is described in detail in Patent Literature 1, that is, a method using a vacuum forming apparatus for performing vacuum forming of a forming resin film between two or more forming chambers, wherein depending on the amount of deformation of the heat-softened forming resin film, a gas with a predetermined constant volume is suctioned into a forming chamber demanding the gas to correct the deformation of the forming resin film by the differential pressure between the forming chambers, and the above gas with constant volume is retained in a plurality of gas supply chambers and is suctioned into the forming chamber demanding the gas by opening a valve.

The above TOM method is receiving attention as a new method, from the viewpoints of reducing environmental impact by replacing paint when used for automobile exteriors, being suitable for a deep drawing formed body, being capable of forming tapered parts and by end winding, being capable of leaving the unevenness on the surface more clearly because of forming by pressurized air, and being capable of expressing more complex design.

CITATION LIST

Patent Literature

Patent Literature 1: Japanese Unexamined Patent Publication No. 2002-67137

SUMMARY OF INVENTION

Technical Problem

However, when the conventional fluorine-based multilayer film is applied to the TOM method, the small thermal dimensional change of the fluorine-based resin layer as the front surface layer has caused a problem that the film is loosened when heated and melted, resulting wrinkles when pressed against the formed product.

Solution to Problem

The present inventors have performed intensive investigations to solve the above problem, and have completed the present invention.

That is, the present invention provides a fluorine-based resin multilayer film for vacuum forming, comprising:

a front surface layer containing 60% by mass to 85% by mass of vinylidene fluoride-based resin and 40% by mass to 15% by mass of methacrylate ester-based resin; and a back surface layer containing 0% by mass to 50% by mass of vinylidene fluoride-based resin and 100% by mass to 50% by mass of methacrylate ester-based resin, wherein the thermal dimensional change in the film flow direction when heated at 120° C. for 30 minutes, which is measured based on Japanese Industrial Standards JIS K7133, is −15% to −2%.

In addition, it is preferable that the thermal dimensional change of the film in the width direction when heated at 120° C. for 30 minutes, which is measured based on JIS K7133, is −3% to +1%.

The fluorine-based resin multilayer film for vacuum forming can be used for a three-dimensional surface decoration method.

The back surface layer may contain 0.1 to 10 parts by mass of an ultraviolet absorber with respect to 100 parts by mass of the resin component.

The ultraviolet absorber is preferable to be one or more selected from triazine compounds and benzotriazole compounds.

It is preferable that the thickness of the front surface layer is 5 to 100 μm and the thickness of the back surface layer is 5 to 300 μm.

The haze measured based on Japanese Industrial Standard JIS K7136 is preferable to be less than 10%.

In the method for manufacturing the fluorine-based resin multilayer film for vacuum forming by a T-die method, the present invention provides the method for manufacturing the fluorine-based resin multilayer film for vacuum forming, including manufacturing when a draft ratio defined by a value obtained by dividing a lip opening representing a width of a lip gap of a T-die by a film thickness is 4 to 35, a surface temperature of the first cooling roll, with which the resin extruded from the T-die is contacted and cooled, is 20 to 90° C., and a draw ratio defined by a value obtained by dividing a film winding speed by a rotation speed of the first cooling roll is 1.05 to 1.30.

Furthermore, the present invention provides a decorative film for vacuum forming, consisting of an adhesive layer, a decorative base material, and the fluorine-based resin multilayer film for vacuum forming, wherein the adhesive layer, the decorative base material, and the fluorine-based resin multilayer film for vacuum forming are stacked in this order.

The decorative base material is preferable to be at least one resin selected from the group consisting of a polyvinyl chloride resin, an ABS resin, a polycarbonate resin, and a styrenic elastomer.

Furthermore, the present invention provides a method for manufacturing an automobile component or an electric appliance component, the method comprising application of a three-dimensional surface decoration method to a core material using the decorative film for vacuum forming.

Still furthermore, the present invention provides an automobile component or an electric appliance component manufactured by the above manufacturing method.

Advantageous Effects of Invention

According to the present invention, when the decorative film for vacuum forming having a stacked structure is heated, rippling due to the difference in thermal dimensional change of each layer and sagging due to its own weight are less likely to occur, and the generation of wrinkles when pressed to the formed body can be suppressed.

DESCRIPTION OF EMBODIMENTS

Hereinafter, suitable embodiments of the present invention will be described. The embodiments described below are representative embodiments of the present invention, and according to them, the scope of the present invention is not construed as being narrow.

[1. Fluorine-Based Resin Multilayer Film for Vacuum Forming]

The fluorine-based resin multilayer film for vacuum forming according to the present embodiment may consist of only the front surface layer and the back surface layer, or may have at least the front surface layer and the back surface layer.

1-1. Front Surface Layer

The front surface layer contains 60% by mass to 85% by mass of a vinylidene fluoride-based resin and 40% by mass to 15% by mass of a methacrylate ester-based resin. An example thereof is a layer in which a polyvinylidene fluoride resin (PVDF) accounts for 60% by mass to 85% by mass and is rich.

When the content of the vinylidene fluoride-based resin is less than 60% by mass, that is, when the content of the methacrylate ester-based resin is more than 40% by mass, weather resistance, light stability, chemical resistance, antifouling property, flame retardancy, and the like may not be sufficiently obtained. On the other hand, when the content of the vinylidene fluoride-based resin is more than 85% by mass, that is, when the content of the methacrylate ester-based resin is less than 15% by mass, the effect of improving the adhesiveness to the back surface layer may not be sufficiently obtained.

Preferably, the front surface layer contains 70% by mass to 85% by mass of the vinylidene fluoride-based resin and 30% by mass to 15% by mass of the methacrylate ester-based resin.

When the content of the vinylidene fluoride-based resin is 70% by mass or more, that is, when the content of the methacrylate ester-based resin is 30% by mass or less, weather resistance, light stability, chemical resistance, antifouling property, flame retardancy, and the like are more preferably obtained.

The vinylidene fluoride-based resin may be a homopolymer of vinylidene fluoride or a copolymer of vinylidene fluoride and another fluorine-containing monomer. Examples of the fluorine-containing monomer capable of forming a copolymer with vinylidene fluoride include fluorinated vinyl compounds such as vinyl fluoride, ethylene tetrafluoride, ethylene trifluoride chloride, propylene hexafluoride, isobutylene hexafluoride, and various fluoroalkyl vinyl ethers, and known vinyl monomers such as styrene, ethylene, butadiene, and propylene.

To ensure the weather resistance, light stability, chemical resistance, antifouling property, flame retardancy, and the like of the vinylidene fluoride-based resin film, it is preferable that the amount of the monomer other than vinylidene fluoride in the vinylidene fluoride-based resin is 50% by mass or less.

Examples of the methacrylate ester constituting the methacrylate ester-based resin include methyl methacrylate, ethyl methacrylate, propyl methacrylate, butyl methacrylate, pentyl methacrylate, and hexyl methacrylate. Among them, methyl methacrylate is suitable. In addition, the alkyl group such as a propyl group, a butyl group, a pentyl group, and a hexyl group in the methacrylate ester may be linear or branched.

Examples of the monomer copolymerizable with the methacrylate ester include acrylate ester having a carbon number of 1 to 8 such as methyl acrylate and butyl acrylate, styrene, α-methylstyrene, acrylonitrile, acrylic acid, and other ethylenically unsaturated monomers.

From the viewpoint of improving the compatibility with the vinylidene fluoride-based resin and ensuring transparency and mechanical strength when a film is formed, it is preferable that the amount of the monomer other than the methacrylate ester in the methacrylate ester-based resin is 50% by mass or less.

Furthermore, the front surface layer may consist of only the vinylidene fluoride-based resin and the methacrylate ester-based resin, but as necessary, for example, may contain a heat stabilizer to such an extent that the effects of the present invention are not impaired. Examples of the heat stabilizer include a phenolic antioxidant, a phosphorus-based antioxidant, a sulfur-based antioxidant, an epoxy compound, and a β-diketone. Among them, the phenolic antioxidant and the phosphorus-based antioxidant are preferable because of not impairing the transparency of the front surface layer.

The addition amount of the heat stabilizer is not particularly limited, and is preferably 0.001 to 5% by mass and more preferably 0.1 to 1.0% by mass.

At 0.001% by mass or more, sufficient heat stability can be obtained, and at 5% by mass or less, the transparency of the front surface layer can be maintained.

Furthermore, in addition to the heat stabilizer, the ultraviolet absorber described below, plasticizer, lubricant, antistatic agent, antifogging agent, dropping agent, hydrophilic agent, liquid repellent agent, and the like may be contained to such an extent that the effects of the present invention are not impaired in either the front surface layer or the back surface layer described below, or in both the front surface layer and the back surface layer.

Addition only to the back surface layer is particularly preferable since the occurrence of defects due to the transfer of these additives to the front surface layer can be prevented.

1-2. Back Surface Layer

The back surface layer consists of 100% by mass of a methacrylate ester-based resin. Alternatively, the back surface layer contains 50% by mass or less of a vinylidene fluoride-based resin and 50% by mass or more of the methacrylate ester-based resin. An example thereof is a polymethyl methacrylate (PMMA) rich layer.

When the amount of the vinylidene fluoride-based resin is more than 50% by mass, that is, when the amount of the methacrylate ester-based resin is less than 50% by mass, the interlayer adhesiveness with a decorative base material may be deteriorated.

Preferably, the back surface layer contains 20% by mass or less of the vinylidene fluoride-based resin and 80% by mass or more of the methacrylate ester-based resin.

When the content of the vinylidene fluoride-based resin is 20% by mass or less, that is, when the content of the methacrylate ester-based resin is 80% by mass or more, the adhesiveness to the front surface layer or another layer such as a decorative base material described below is improved.

The configurations of the vinylidene fluoride-based resin and the methacrylate ester-based resin are the same as those described above.

1-3. Ultraviolet Absorber

Furthermore, an ultraviolet absorber can be added to the back surface layer as necessary. Examples of the ultraviolet absorber include, but are not particularly limited to, organic ultraviolet absorbers such as a triazine ultraviolet absorber, a benzotriazole ultraviolet absorber, and a benzophenone ultraviolet absorber. Preferably, the ultraviolet absorber is one or more selected from a triazine ultraviolet absorber and a benzotriazole ultraviolet absorber. These ultraviolet absorbers are preferable from the viewpoint of long-term hue stability against a moist heat environment and ultraviolet rays, the viewpoint of compatibility with the vinylidene fluoride-based resin, and the viewpoint of sustainability of ultraviolet blocking effect.

Examples of the triazine ultraviolet absorber include 2-(4,6-diphenyl-1,3,5-triazin-2-yl)-5-[2-(2-ethylhexanoyloxy)ethoxy]phenol, 2-(4,6-diphenyl-1,3,5-triazin-2-yl)-5-[(hexyl)oxy]phenol, 2-(4,6-diphenyl-1,3,5-triazin-2-yl)-5-[(hexyl)oxy]-phenol, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2,4-bis(2,4-dimethylphenyl)-6-(2-hydroxy-4-iso-octyloxyphenyl)-s-triazine, and mixtures, modifications, polymers, and derivatives thereof.

Among them, 2-(4,6-diphenyl-1,3,5-triazin-2-yl)-5-[(hexyl)oxy]phenol is preferable.

Examples of the benzotriazole ultraviolet absorber include 2-(2'-hydroxy-3'-tert-butyl-5'-methylphenyl)-5-chlorobenzotriazole, 2-(2H-benzotriazol-2-yl)-4,6-bis(1-methyl-1-phenylethyl)phenol, 2-(5'-methyl-2'-hydroxyphenyl)benzotriazole, 2-(5'-t-butyl-2'-hydroxyphenyl)benzotriazole, 2-[2'-hydroxy-3',5'-bis(α,α-dimethylbenzyl)phenyl]benzotriazole, 2-(3',5'-di-tert-butyl-2'-hydroxyphenyl)benzotriazole, 2-(3'-t-butyl-5'-methyl-T-hydroxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl) benzotriazole, 2-[3'-(3",4",5",6"-tetrahydrophthalimidomethyl)-5'-methyl-2'-hydroxyphenyl] benzotriazole, 2,2'-methylenebis [4-(1,1,3,3-tetramethylbutyl)-6-(2H-benzotriazol-2-yl) phenol], and mixtures, modifications, polymers, and derivatives thereof.

Among them, 2-(2H-benzotriazol-2-yl)-4,6-bis(1-methyl-1-phenylethyl)phenol is preferable.

The content of the ultraviolet absorber is not particularly limited, and it is preferable that 0.1 to 10 parts by mass are contained with respect to 100 parts by mass of the resin component. When the content is 0.1 parts by mass or more, a sufficient ultraviolet ray cutting performance can be obtained, and a further effect of improving weather resistance can be expected. In addition, setting the content to 10 parts by mass or less can prevent the ultraviolet absorber from bleeding out to the surface of the back surface layer, prevent deterioration of adhesion to the front surface layer of the vinylidene fluoride-based resin for vacuum forming and the decorative substrate, and further suppress deterioration of the transparency of the vinylidene fluoride-based resin for vacuum forming and the visibility and color tone of the decorative base material.

1-4. Thermal Dimensional Change

For the fluorine-based resin multilayer film for vacuum forming of the present embodiment, the thermal dimensional change in the flow direction of the film in heating at 120° C. for 30 minutes, which is measured based on Japanese Industrial Standards JIS K7133, is −15% to −2%.

JIS K7133 specifies a method for measuring a dimensional change of a plastic film and sheet due to heating in the machine and transverse directions.

When the thermal dimensional change in the film flow direction (machine direction) is less than −15% in heating the fluorine-based resin multilayer film for vacuum forming of the present embodiment at 120° C. for 30 minutes based on the measurement method, in the thermal lamination with the decorative base material, which is a pre-process of vacuum forming, the dimensional stability against heat is poor, furthermore, the shrinkage in heating the film is large even in vacuum forming, and a hole is opened in the decorative film, which is not appropriate. When the thermal dimensional change is more than −2%, the film is loosened in heating the film in vacuum forming, and wrinkles is generated on the surface of the formed body to be coated, which is not appropriate.

More preferably, the thermal dimensional change is −4% to −3%. When the thermal dimensional change is −4% or more, in the thermal lamination with the decorative base material, which is the pre-process of vacuum forming, the dimensional stability against heat is better, which is preferable, and when the rate is −3% or less, the film is stretched in heating the film and hence wrinkles hardly generates in the surface of the formed body to be coated, which is preferable.

It is also preferable that the thermal dimensional change in the film width direction (transverse direction) on heating the fluorine-based resin multilayer film for vacuum forming of this embodiment at 120° C. for 30 minutes based on HS K7133 is −3% to +1%. When the thermal dimensional change is −3% or more, in the thermal lamination with the decorative base material, which is the pre-process of vacuum forming, the dimensional stability against heat is good, which is preferable, and when the rate is +1% or less, the film is stretched in heating the film and hence wrinkles hardly generates in the surface of the formed body to be coated, which is preferable.

Here, the shrinkage ratio under heating conditions of 120° C. for 30 minutes is specified. This is because the reproducibility of measurement is improved by heating for a long time (30 minutes).

The actual vacuum forming is performed at a temperature (for example, 130° C.) at which the fluorine-based resin multilayer film for vacuum forming softens in several tens of seconds from the viewpoint of process efficiency.

It has been found that the value of the thermal dimensional change obtained under heating conditions of 120° C. for 30 minutes correlates well with the shrinkage of the film in vacuum forming, that is, the formability.

1-5. Thickness of Layer

The thickness of the front surface layer of the fluorine-based resin multilayer film for vacuum forming is not particularly limited, and is preferable to be 5 to 100 μm. At 5 μm or more, the thickness becomes effective as a coating film for the decorative base material. At 100 μm or less, the function as a coating film of the decorative base material can be sufficiently exhibited, and the cost can be suppressed.

The thickness of the back surface layer of the fluorine-based resin multilayer film for vacuum forming is not particularly limited, and is preferable to be 5 to 300 μm. At 5 μm or more, the adhesiveness to the decorative base material and the effect of preventing ultraviolet rays can be exhibited. At 300 μm or less, the cost is suppressed and the operability at vacuum forming is good while maintaining the adhesiveness to the decorative base material and the effect of preventing ultraviolet rays.

1-6. Haze

The fluorine-based resin multilayer film for vacuum forming is preferable to have a haze of less than 10% in measurement based on Japanese Industrial Standards JIS K7136.

JIS K7136 specifies how to determine haze, which is a specific optical property related to wide-angle scattering of light rays, for a transparent and basically colorless plastic.

When the haze of the fluorine-based resin multilayer film for vacuum forming measured based on the measurement method is less than 10%, the transparency of the film is high, and the visibility and clarity of the design of the decorative base material are high.

1-7. Other Layers

For example, to protect the front surface layer from scratches and acid rain, for the purpose of giving specific properties to the front surface layer, a plasticizer, a lubricant, an antistatic agent, an antifogging agent, a dropping agent, a hydrophilic agent, a liquid repellent agent and the like can also be stacked on the front surface layer. For example, these agents may be stacked, dipped, applied, or sprayed on the front surface layer to such an extent that the effects of the present invention are not impaired.

[2. Method for Manufacturing a Fluorine-Based Resin Multilayer Film for Vacuum Forming]

The multilayer film with the front surface layer and the back surface layer can be manufactured by the method of plasticizing and melting the raw material of the above front surface layer, separately plasticizing and melting the raw material of the back surface layer, and using an extruder for manufacturing the front surface layer (extruder A) and an extruder for the back surface layer (extruder B) to merge and stack the front surface layer and the back surface layer in a feed block arranged on the upstream side of the T-die (that is, on the downstream side of the extruders) and to widen and extrude the resultant film with the T-die.

At this time, the draft ratio defined by a value obtained by dividing the lip opening representing the width of the lip gap of the T-die by the film thickness is set at 4 to 35. At less than 4, the pressure drop at the lip portion becomes small due to the large lip opening and the uniformity of the thickness in the film width direction is reduced, which is thus unpreferable. At more than 35, the orientation of the resin becomes strong, the anisotropy of the physical properties of the film becomes strong, and the degree of the lip opening is small, thereby significantly generating die drool from the resin, which is thus unpreferable. More preferably, the draft ratio is set at 10 to 25. At 10 or more, the pressure drop at the lip portion becomes sufficiently large and the uniformity of the thickness in the film width direction is improved, which is thus preferable, and at 25 or less, the anisotropy of the physical properties of the film becomes small, which is thus preferable.

Another stacking method is a multi-manifold die method. This method is a method in which the resin of each layer is widened in a T-die, then each layer is merged and extruded, and can be suitably used in manufacturing the multilayer film of the present embodiment. In this method, it is also preferable that the draft ratio is equal to that of the above method using the feed block.

The molten resin extruded according to the method described above is extruded into a film from a T-die, and then cooled while being sandwiched between the first cooling roll consisting of hard chrome plating and the touch roll consist of silicone rubber, and the thickness is adjusted to a predetermined thickness by the speed of the resin at the exit of the T-die and the difference of the take-over speed between the first cooling roll and the touch roll.

Here, the surface temperature of the first cooling roll to which the resin extruded from the T-die is cooled by contact is set at 20 to 90° C. At less than 20° C., the shrinkage of the film after film formation becomes large and blocking and feeding failure may occur due to tightening of the roll and at more than 90° C., the film sticks to the first cooling roll and the film-forming property deteriorates, which is thus unpreferable. More preferably, the surface temperature of the first cooling roll is set at 30 to 70° C. At 30° C. or more, shrinkage of the film after film formation is suppressed and blocking and feeding failure due to tightening of the roll hardly occur, which is preferable. At 70° C. or less, the peelability of the film from the first cooling roll becomes good, which is preferable.

Furthermore, the draw ratio defined by a value obtained by dividing a film winding speed by a rotation speed of the first cooling roll is set at 1.05 to 1.30. At less than 1.05, the film is loosened on the pass line, resulting in poor conveyance, and at more than 1.30, the tension of the film excessively increases on the pass line, and the film may be broken, which is thus unpreferable. More preferably, the draw ratio is set at 1.08 to 1.20. At 1.08 or more, the film can be conveyed without slack, which is thus preferable, and at 1.20 or less, the film is not broken without increasing the tension of the film on the pass line, which is thus preferable.

[3. Decorative Film for Vacuum Forming]

A decorative film for vacuum forming has a structure in which an adhesive layer, a decorative base material, and a fluorine-based resin multilayer film are stacked in this order from bottom. In this case, generally, the back surface layer side of the fluorine-based resin multilayer film for vacuum forming is in contact with the decorative base material.

The adhesive of the adhesive layer is not particularly limited, and for example, a main agent such as a polyester resin, an olefin resin, a polyether resin, and an acrylic resin and a curing agent such as an isophorone diisocyanate, diphenylmethane diisocyanate, tolylene diisocyanate, and xylene diisocyanate can be appropriately used in combination.

Examples of the method for stacking the adhesive layer and the decorative base material include: a method of applying a mixture of a solvent, a main agent, and a curing agent on the decorative base material and drying; and a method of applying a mixture of a solvent, a main agent, and a curing agent to a separator obtained by applying a releasing agent to a polyester film, drying, and laminating with the decorative base material, and are not particularly limited.

Examples of the decorative base material include a decorative film and a decorative sheet on which designs such as printing, coloring, and embossing are applied, and are not particularly limited.

The material of the above decorative base material is at least one resin selected from the group consisting of a polyvinyl chloride resin, an ABS resin, a polycarbonate resin, and a styrenic elastomer, and is not particularly limited.

Examples of the method of stacking the decorative base material and the fluorine-based resin multilayer film for vacuum forming include: a method in which the resin of each layer is molten and kneaded by an extruder, stacked in a feed block, and extruded from a T-die; a method in which the resin material of each layer is molten and kneaded with an extruder, stacked inside a multi-manifold die, and extruded; a method of thermal lamination by a Roll to Roll method; and a method of lamination with an adhesive, and are not particularly limited. Examples of the adhesive include an acrylic pressure-sensitive adhesive and a hot melt adhesive. Preferably, there is a method of thermal lamination by a Roll to Roll method.

As the order of stacking the adhesive layer, the decorative base material, and the fluorine-based resin multilayer film for vacuum forming, it is preferable that the back surface layer of the fluorine-based resin multilayer film for vacuum forming and the decorative base material are subjected to thermal lamination by a Roll to Roll method, and then a mixture of a solvent, a main agent, and a curing agent is applied to the decorative base material and dried to form the adhesive layer thereon, and the order is not particularly limited.

[4. Method for Manufacturing an Automobile Component and an Electric Appliance Component]

An automobile component is not limited to an interior component and an exterior component for automobiles, and the front surface layer is a vinylidene fluoride-based resin-rich layer and has chemical resistance to sun oil and sunscreen and hence is particularly suitable for the interior component.

An electric appliance component is not limited to a domestic electric appliance component and precision electric and electronic device components. In addition, the electric appliance component can be used as an indoor functional component and a decorative component for an office, an office building, a private house, or an apartment house.

The automobile component or electric appliance component can be manufactured by processing the above decorative film for vacuum forming by a three-dimensional surface decoration method. The vacuum forming apparatus used in the method is commercially available (Fuse Vacuum Co., Ltd., Japan).

The vacuum forming apparatus comprises a forming chamber separated into an upper and lower ones by the set decorative film for vacuum forming, and has a structure in which the upper and lower forming chambers can be joined and separated and the decorative film for vacuum forming is vacuum formed between the upper and lower forming chambers. A vacuum circuit and an air circuit are provided in the upper and lower forming chambers, respectively.

The upper forming chamber and the lower forming chamber move up and down. Furthermore, a table is arranged inside the lower forming chamber, and the table can be moved up and down. On the table, a core material to be covered with the decorative film for vacuum forming can be placed.

In the upper forming chamber, a heater is incorporated and the decorative film for vacuum forming is heated by the heater between the two forming chambers joined to each other. As the heater, for example, a near infrared heater can be used. Preferably, heating is performed to 130° C.

In order to manufacture an automobile component or an electric appliance component, a core material is set on the table in the lower forming chamber of the vacuum forming apparatus. The decorative film for vacuum forming is fixedly set on the upper surface of the lower forming chamber with a clamp. At this time, both the upper forming chamber and the lower forming chamber are at atmospheric pressure.

The upper forming chamber is lowered, and the upper forming chamber and the lower forming chamber are joined to be closed. At this time, the upper forming chamber and the lower forming chamber are separated by the decorative film for vacuum forming. Then, the upper and lower forming chambers are changed from an atmospheric pressure state to a vacuum suction state by a vacuum tank.

The upper and lower forming chambers are in a vacuum suction state, and the decorative film for vacuum forming is heated by the heater. When heated, the decorative film for vacuum forming tends to sag by its own weight.

At this time, the gas with a constant volume predetermined depending on the deformation of the heat-softened decorative film for vacuum forming is, for example, suctioned into the lower forming chamber in which the decorative film for vacuum forming sags, and thereby the deformation of the decorative film for vacuum forming is corrected by the pressure difference between the upper and lower forming chambers.

Furthermore, the above gas with a constant volume is retained in a gas supply chamber which has been installed, and is suctioned into the lower forming chamber as necessary. Thus, adjusting the pressure difference of the degree of vacuum between the upper and lower forming chambers corrects the decorative film for vacuum forming to a substantially horizontal state.

Thereafter, the table in the lower forming chamber is raised. At this time, the upper and lower forming chambers are in a substantially vacuum state.

Then, the vacuum is released in the upper forming chamber and atmospheric pressure is applied, and thereby the decorative film for vacuum forming is pressed against the core material and formed.

When a conventional film is formed by TOM forming, it curves and sags by its own weight in heating the film, and hence the deformation of the film has been corrected by the pressure difference between the upper and lower forming chambers, but wrinkles have occurred on the surface of the obtained formed product.

However, using the decorative film for vacuum forming of the present embodiment for TOM forming can suppress the occurrence of wrinkles on the surface of the obtained formed product.

EXAMPLES

Hereinafter, the present invention will be described in more detail based on Examples. Examples described below are representative Examples of the present invention, and according to them, the scope of the present invention is not construed as being narrow.

<Raw Material>
(Vinylidene Fluoride-Based Resin)
Polyvinylidene fluoride Kynar "1000HD", manufactured by Arkema Co., Ltd.
Polyvinylidene fluoride Kynar "K720", manufactured by Arkema Co., Ltd.
Polyvinylidene fluoride Kynar "K741C", manufactured by Arkema Co., Ltd.
(Methacrylate Ester-Based Resin)
Polymethyl methacrylate (PMMA) SUMIPEX "MGSS", manufactured by Sumitomo Chemical Co., Ltd.
Methacrylate ester-based resin HIPET "HBS000", manufactured by Mitsubishi Chemical Corporation
(Ultraviolet Absorber)
Triazine ultraviolet absorber "Tinuvin 1577ED", manufactured by BASF Co., Ltd.
Benzotriazole ultraviolet absorber "Tinuvin 234", manufactured by BASF Co., Ltd.
<Compounding Process>
When two or more of raw materials were mixed and used, each raw material was preliminarily mixed in a non-molten state, then melted in a melt mixing facility, and uniformly mixed. Thereafter, it was extruded to provide strand-shaped mixture, cooled, and then cut to provide pellet-shaped one, which was used as a raw material.

<Melt Mixing Facility>
Twin screw extruder "KTX30" (screw length (L [mm])/screw diameter (D [mm])=46.8), manufactured by Kobe Steel Co., Ltd.
Configuration of screw kneading part: VCMT kneading part and kneading part in C5 to C8 process part in a cylinder
Screen mesh: Those obtained by stacking three meshes each having a mesh opening of 0.25 mm, 0.075 mm, and 0.25 mm from the screw side were used.

<Film Production Process>
The raw material obtained by the above compounding process was sufficiently melted by the following extruder, and then the resins in each extruder were stacked in a feed block, widened in a coat hanger T-die, and extruded to provide a film-shaped resin. The above film-shaped resin was discharged downward and then obtained by cooling while sandwiched between a hard chrome plating roll (surface arithmetic average roughness Ra=0.2 μm) and a white mirror roll, which were immediately temperature-controlled, and taken over.

At this time, the draft ratio defined by a value obtained by dividing the lip opening representing the width of the lip gap of the T-die by the film thickness was set at 15.

Here, the surface temperature of the first cooling roll to which the resin extruded from the T-die was cooled by contact was set at 50° C.

Furthermore, the draw ratio defined by a value obtained by dividing the film winding speed by the rotation speed of the first cooling roll was set at 1.1.

<Extruder a (Front Surface Layer Side in Multilayer Configuration)>
Single screw extruder (L/D=25), manufactured by Tanabe Plastics Machine Co., Ltd.
Screw type: full flight screw
<Extruder B (Back Surface Layer Side in Multilayer Configuration)>
Single screw extruder (L/D=25), manufactured by Plastic Engineering Laboratory Co., Ltd.
Screw type: full flight screw
<T-Die>
Coat hanger type, manufactured by Sun Engineering Co., Ltd., and width: 550 mm, lip opening: 0.5 mm Examples and Comparative Examples In Examples 1 to 10 and Comparative Examples 1 to 4, a fluorine-based resin multilayer film for vacuum forming was manufactured with the compositions shown in Table 1 and Table 2 according to the above manufacturing method. Furthermore, the decorative base material was polyvinyl chloride blended with titanium oxide, and a fluorine-based resin multilayer film for vacuum forming was stacked on the decorative base material so that the back surface layer side thereof was in contact with the decorative base material.

In addition, thicknesses of the front surface layer, the back surface layer, and the decorative base material and the thermal dimensional change in the flow direction and width direction of the fluorine-based resin multilayer film for vacuum forming in each Example and Comparative Example are shown in Table 1 and Table 2.

<Visual Evaluation Method of Decorative Film for Vacuum Forming>
Looseness of Decorative Film for Vacuum Forming
When a decorative film for vacuum forming was heated at 130° C., it was evaluated as × by visual observation when the looseness occurred, ○ when the looseness was small, and ⊚ when no looseness occurred.

Wave of Decorative Film for Vacuum Forming
When the decorative film for vacuum forming was heated at 130° C., it was evaluated as × by visual observation when the wave occurred, 0 when the wave was small, and ⊚ when no wave occurred.

Perforation of Decorative Film for Vacuum Forming
When the decorative film for vacuum forming was heated at 130° C., it was evaluated as × by visual observation when perforation occurred and ○ when no perforation occurred.

Wrinkles of Vacuum Formed Product
A vacuum formed product (130° C. heating) was visually observed, and it was evaluated as × when wrinkles occurred on the surface and ○ when no wrinkles occurred.

<Base Protection Test>
For a sample subjected to thermal lamination of a white vinyl chloride film on the back surface layer, an acceleration test under the following conditions was performed with a metal weather ultraviolet irradiation tester (manufactured by Daipla Wintes Co., Ltd.). For the sample before and after the test, using a spectral color difference meter ZE6000 (manufactured by Nippon Denshoku Industries Co., Ltd.), the change Δb in yellowness was evaluated at the front surface layer side.

Irradiation intensity: 132 mW/cm$^2$
Ultraviolet irradiation surface: front surface layer
Black panel temperature 63° C.
Irradiation/dew cycle=6 hours/2 hours
<Antifouling Property Test>
According to the following test for type I antifouling materials, the antifouling property of the vacuum formed product was inspected.

(1) The brightness (L0) before the test was evaluated with a color difference meter.

(2) A suspension solution (carbon black FW-200 (manufactured by Degussa Co., Ltd.)/deionized water=5% by mass/95% by mass) was applied by air spray until the surface of the formed product was uniformly concealed.

(3) The formed product was dried at 60° C. for 1 hour and then allowed to cool to room temperature.

(4) Under flowing water, the formed product was washed while removing dirty substance on the surface with gauze (BENCOT M-3 (manufactured by Asahi Kasei Corporation)).

(5) The brightness (L1) after the test was evaluated with a color difference meter.

(6) The degree of dirt (brightness difference ΔL) was determined by the following formula.

Brightness difference ΔL=brightness L1 after test−brightness L0 before test

<Chemical Resistance>

Sunscreen (Neutrogena (registered trademark)) and sun oil (Copatone (registered trademark)) were dropped on the surface of the film, and then the film was placed in an 80° C. environment for 1 hour, washed on the surface with ethanol, and evaluated for the appearance.

"No change in appearance" was evaluated as "⊚", "slight swelling traces remain on the film" as "○", and "film becomes cloudy" as "×".

<Peel Strength Test>

A test of the peel strength between the fluorine-based resin multilayer film for vacuum forming and the decorative base material was performed by using a strograph VE1D (manufactured by Toyo Seiki Seisaku-sho, Ltd.). The back surface layer side of the fluorine-based resin multilayer film for vacuum forming and the white vinyl chloride film as a decorative base material were sandwiched between a 140° C. hard chrome plating roll and a 140° C. silicone rubber roll and were subjected to thermal lamination at a speed of 1 m/min. A strip-shaped sample with a width of 15 mm and a length of 150 mm was cut out, the end thereof was peel off, and a 180° peeling test was performed at a speed of 200 mm/min by holding the fluorine-based resin multilayer film for vacuum forming in the upper chuck of the apparatus and the white vinyl chloride film in the lower chuck of the apparatus. The maximum load at that time was recorded as the peel strength.

TABLE 1

| | | | | Example 1 | Example 2 | Example 3 | Example 4 |
|---|---|---|---|---|---|---|---|
| Physical properties | Thermal dimensional change [%] (JIS K7133 120° C. for 30 minutes) | | Flow direction | −3 | −2 | −15 | −3 |
| | | | Width direction | −1 | −1 | −1 | −1 |
| | HAZE value [%] | | | 1.5 | 1.7 | 1.3 | 1.5 |
| Composition | Front surface layer | PVDF [Wt %] | Kynar 1000HD | 70 | 85 | 60 | 70 |
| | | PMMA [Wt %] | SUMIPEX MGSS | 30 | 15 | 40 | 30 |
| | Back surface layer | PVDF [Wt %] | Kynar 1000HD | 5 | 5 | 5 | 35 |
| | | | Kynar K741C | 5 | 5 | 5 | 5 |
| | | | Kynar K720 | 10 | 10 | 10 | 10 |
| | | PMMA [Wt %] | HIPET HBS000 | 80 | 80 | 80 | 50 |
| | | Ultraviolet absorber [PHR] | Tinuvin 1577ED (triazine UVA) | 4.3 | 4.3 | 4.3 | 4.3 |
| | | | Tinuvin 234 (benzotriazole UVA) | 0 | 0 | 0 | 0 |
| | Decorative base material | | | Polyvinyl chloride + Titanium oxide | | | |
| Thickness | Front surface layer [μm] | | | 17 | 17 | 17 | 17 |
| | Back surface layer [μm] | | | 33 | 33 | 33 | 33 |
| | Decorative base material [μm] | | | 130 | | | |
| Evaluation | Film looseness in vacuum forming (130° C. heating) | | | ⊚ | ○ | ⊚ | ⊚ |
| | Film wave in vacuum forming (130° C. heating) | | | ⊚ | ○ | ⊚ | ⊚ |
| | Film perforation in vacuum forming (130° C. heating) | | | ○ | ○ | ○ | ○ |
| | Film wrinkles in vacuum forming (130° C. heating) | | | ○ | ○ | ○ | ○ |
| | Δb of white vinyl-chloride laminated film after MW576 hours (base protection) | | | 1.5 | 1.5 | 1.5 | 1.5 |
| | ΔL in test for type I antifouling materials (antifouling) | | | −4 | −2 | −6 | −4 |
| | Chemical resistance (80° C. for 1 hour) | | Sunscreen | ⊚ | ⊚ | ○ | ⊚ |
| | | | Sun oil | ⊚ | ⊚ | ○ | ⊚ |
| | Peel strength with white vinyl chloride film [N/15 mm] (thermal lamination) | | | 10 | 10 | 10 | 8 |

| | | | | Example 5 | Example 6 | Example 7 |
|---|---|---|---|---|---|---|
| Physical properties | Thermal dimensional change [%] (JIS K7133 120° C. for 30 minutes) | | Flow direction | −3 | −3 | −3 |
| | | | Width direction | −1 | −1 | −1 |
| | HAZE value [%] | | | 1.5 | 1 | 3 |
| Composition | Front surface layer | PVDF [Wt %] | Kynar 1000HD | 70 | 70 | 70 |
| | | PMMA [Wt %] | SUMIPEX MGSS | 30 | 30 | 30 |
| | Back surface layer | PVDF [Wt %] | Kynar 1000HD | 0 | 5 | 5 |
| | | | Kynar K741C | 0 | 5 | 5 |
| | | | Kynar K720 | 0 | 10 | 10 |

TABLE 1-continued

|  |  |  |  |  |  |  |
|---|---|---|---|---|---|---|
|  |  | PMMA [Wt %] | HIPET HBS000 | 100 | 80 | 80 |
|  |  | Ultraviolet absorber [PHR] | Tinuvin 1577ED (triazine UVA) | 4.3 | 0.1 | 10 |
|  |  |  | Tinuvin 234 (benzotriazole UVA) | 0 | 0 | 0 |
|  | Decorative base material |  |  | Polyvinyl chloride + Titanium oxide | | |
| Thickness | Front surface layer [μm] |  |  | 17 | 17 | 17 |
|  | Back surface layer [μm] |  |  | 33 | 33 | 33 |
|  | Decorative base material [μm] |  |  | 130 | | |
| Evaluation | Film looseness in vacuum forming (130° C. heating) |  |  | ◎ | ◎ | ◎ |
|  | Film wave in vacuum forming (130° C. heating) |  |  | ◎ | ◎ | ◎ |
|  | Film perforation in vacuum forming (130° C. heating) |  |  | ○ | ○ | ○ |
|  | Film wrinkles in vacuum forming (130° C. heating) |  |  | ○ | ○ | ○ |
|  | Δb of white vinyl-chloride laminated film after MW576 hours (base protection) |  |  | 1.5 | 3 | 0.5 |
|  | ΔL in test for type I antifouling materials (antifouling) |  |  | −4 | −4 | −4 |
|  | Chemical resistance (80° C. for 1 hour) | Sunscreen |  | ◎ | ◎ | ◎ |
|  |  | Sun oil |  | ◎ | ◎ | ◎ |
|  | Peel strength with white vinyl chloride film [N/15 mm] (thermal lamination) |  |  | 12 | 10 | 10 |

TABLE 2

|  |  |  |  | Example 8 | Example 9 | Example 10 | Comparative Example 1 |
|---|---|---|---|---|---|---|---|
| Physical properties | Thermal dimensional change [%] (JIS K7133 120° C. for 30 minutes) | Flow direction |  | −3 | −3 | −3 | −0.5 |
|  |  | Width direction |  | −1 | −1 | −1 | −1 |
|  | HAZE value [%] |  |  | 1.5 | 1 | 3 | 1.5 |
| Composition | Front surface layer | PVDF [Wt %] | Kynar 1000HD | 70 | 70 | 70 | 90 |
|  |  | PMMA [Wt %] | SUMIPEX MGSS | 30 | 30 | 30 | 10 |
|  | Back surface layer | PVDF [Wt %] | Kynar 1000HD | 5 | 5 | 5 | 5 |
|  |  |  | Kynar K741C | 5 | 5 | 5 | 5 |
|  |  |  | Kynar K720 | 10 | 10 | 10 | 10 |
|  |  | PMMA [Wt %] | HIPET HBS000 | 80 | 80 | 80 | 80 |
|  |  | Ultraviolet absorber [PHR] | Tinuvin 1577ED (triazine UVA) | 0 | 4.3 | 4.3 | 4.3 |
|  |  |  | Tinuvin 234 (benzotriazole UVA) | 4.3 | 0 | 0 | 0 |
|  | Decorative base material |  |  | Polyvinyl chloride + Titanium oxide | | | |
| Thickness | Front surface layer [μm] |  |  | 17 | 5 | 100 | 17 |
|  | Back surface layer [μm] |  |  | 33 | 5 | 300 | 33 |
|  | Decorative base material [μm] |  |  | 130 | | | |
| Evaluation | Film looseness in vacuum forming (130° C. heating) |  |  | ◎ | ◎ | ◎ | X |
|  | Film wave in vacuum forming (130° C. heating) |  |  | ◎ | ◎ | ◎ | X |
|  | Film perforation in vacuum forming (130° C. heating) |  |  | ○ | ○ | ○ | ○ |
|  | Film wrinkles in vacuum forming (130° C. heating) |  |  | ○ | ○ | ○ | X |
|  | Δb of white vinyl-chloride laminated film after MW576 hours (base protection) |  |  | 2 | 1.5 | 0.5 | 1.5 |
|  | ΔL in test for type I antifouling materials (antifouling) |  |  | −4 | −4 | −4 | −3 |
|  | Chemical resistance (80° C. for 1 hour) | Sunscreen |  | ◎ | ◎ | ◎ | ◎ |
|  |  | Sun oil |  | ◎ | ◎ | ◎ | ◎ |
|  | Peel strength with white vinyl chloride film [N/15 mm] (thermal lamination) |  |  | 10 | 10 | 10 | 10 |

|  |  |  |  | Comparative Example 2 | Comparative Example 3 | Comparative Example 4 |
|---|---|---|---|---|---|---|
| Physical properties | Thermal dimensional change [%] (JIS K7133 120° C. for 30 minutes) | Flow direction |  | −16 | −3 | −0.5 |
|  |  | Width direction |  | −1 | −1 | −0.5 |
|  | HAZE value [%] |  |  | 1 | 1.5 | 11 |

TABLE 2-continued

| Composition | Front surface layer | PVDF [Wt %] | Kynar 1000HD | 20 | 70 | 100 |
|---|---|---|---|---|---|---|
| | | PMMA [Wt %] | SUMIPEX MGSS | 80 | 30 | 0 |
| | Back surface layer | PVDF [Wt %] | Kynar 1000HD | 5 | 55 | 5 |
| | | | Kynar K741C | 5 | 5 | 5 |
| | | | Kynar K720 | 10 | 10 | 10 |
| | | PMMA [Wt %] | HIPET HBS000 | 80 | 30 | 80 |
| | | Ultraviolet absorber [PHR] | Tinuvin 1577ED (triazine UVA) | 4.3 | 4.3 | 4.3 |
| | | | Tinuvin 234 (benzotriazole UVA) | 0 | 0 | 0 |
| | Decorative base material | | | Polyvinyl chloride + Titanium oxide | | |
| Thickness | Front surface layer [μm] | | | 17 | 17 | 100 |
| | Back surface layer [μm] | | | 33 | 33 | 300 |
| | Decorative base material [μm] | | | | | 130 |
| Evaluation | Film looseness in vacuum forming (130° C. heating) | | | ○ | X | X |
| | Film wave in vacuum forming (130° C. heating) | | | ○ | X | X |
| | Film perforation in vacuum forming (130° C. heating) | | | X | ○ | ○ |
| | Film wrinkles in vacuum forming (130° C. heating) | | | ○ | X | X |
| | Δb of white vinyl-chloride laminated film after MW576 hours (base protection) | | | 1.5 | 1.5 | 0.5 |
| | ΔL in test for type I antifouling materials (antifouling) | | | −20 | −4 | −2 |
| | Chemical resistance (80° C. for 1 hour) | | Sunscreen | X | ◎ | ◎ |
| | | | Sun oil | X | ◎ | ◎ |
| | Peel strength with white vinyl chloride film [N/15 mm] (thermal lamination) | | | 10 | 5 | 10 |

The results in Table 1 and Table 2 revealed that the thermal dimensional change in the flow direction of the fluorine-based resin multilayer film for vacuum forming was set at a specific range, allowing looseness and wave of the vacuum formed product to be suppressed (for example, Comparative Example 1), and also allowing perforation and wrinkles in the vacuum formed product to be suppressed by not only the specific thermal dimensional change in the flow direction and but also the synergistic effect with the specific resin composition of the front surface layer and the back surface layer.

The present invention can also be represented by the following embodiments.

[1] A fluorine-based resin multilayer film for vacuum forming, comprising:
a front surface layer containing 60% by mass to 85% by mass of vinylidene fluoride-based resin and 40% by mass to 15% by mass of methacrylate ester-based resin; and
a back surface layer containing 0% by mass to 50% by mass of vinylidene fluoride-based resin and 100% by mass to 50% by mass of methacrylate ester-based resin,
wherein the thermal dimensional change in the film flow direction when heated at 120° C. for 30 minutes, which is measured based on HS K7133, is −15% to −2%.

[2] The fluorine-based resin multilayer film for vacuum forming according to [1], wherein the thermal dimensional change of the film in the width direction when heated at 120° C. for 30 minutes, which is measured based on HIS K7133, is −3% to +1%.

[3] The fluorine-based resin multilayer film according to [1] or [2], wherein it is for a three-dimensional surface decoration method.

[4] The fluorine-based resin multilayer film for vacuum forming according to any one of [1] to [3], wherein the back surface layer contains 0.1 to 10 parts by mass of an ultraviolet absorber with respect to 100 parts by mass of a resin component.

[5] The fluorine-based resin multilayer film for vacuum forming according to [4], wherein the ultraviolet absorber is one or more selected from triazine compounds and benzotriazole compounds.

[6] The fluorine-based resin multilayer film for vacuum forming according to any one of [1] to [5], wherein a thickness of the front surface layer is 5 to 100 μm and a thickness of the back surface layer is 5 to 300 μm.

[7] The fluorine-based resin multilayer film for vacuum forming according to any one of [1] to [6], wherein a haze measured based on JIS K7136 is less than 10%.

[8] A method for manufacturing the fluorine-based resin multilayer film for vacuum forming according to any one of [1] to [7] by a T-die method, wherein
a draft ratio defined by a value obtained by dividing a lip opening representing a width of a lip gap of a T-die by a film thickness is 4 to 35,
a surface temperature of a first cooling roll, with which a resin extruded from the T-die is contacted and cooled, is 20 to 90° C., and
a draw ratio defined by a value obtained by dividing a film winding speed by a rotation speed of the first cooling roll is 1.05 to 1.30.

[9] A decorative film for vacuum forming consisting of an adhesive layer, a decorative base material, and the fluorine-based resin multilayer film for vacuum forming according to any one of [1] to [7].

[10] The decorative film for vacuum forming according to [9], wherein the decorative base material is at least one resin selected from the group consisting of a polyvinyl chloride resin, an ABS resin, a polycarbonate resin, and a styrenic elastomer.

[11] A method for manufacturing an automobile component or an electric appliance component, comprising application of a three-dimensional surface decoration method to a core material using the decorative film for vacuum forming according to [9] or [10].

[12] An automobile component or an electric appliance component manufactured by the manufacturing method according to [11].

The invention claimed is:

1. A fluorine-based resin multilayer film for vacuum forming, comprising:
   a front surface layer containing 60% by mass to 85% by mass of a vinylidene fluoride-based resin and 40% by mass to 15% by mass of a methacrylate ester-based resin; and
   a back surface layer containing 0% by mass to 50% by mass of a vinylidene fluoride-based resin and 100% by mass to 50% by mass of a methacrylate ester-based resin,
   wherein a thermal dimensional change in a film flow direction when heated at 120° C. for 30 minutes, which is measured based on JIS K7133, is −15% to −2%.

2. The fluorine-based resin multilayer film for vacuum forming according to claim 1, wherein a thermal dimensional change of the film in a width direction when heated at 120° C. for 30 minutes, which is measured based on JIS K7133, is −3% to +1%.

3. The fluorine-based resin multilayer film for vacuum forming according to claim 1, wherein it is for a three-dimensional surface decoration method.

4. The fluorine-based resin multilayer film for vacuum forming according to claim 1, wherein the back surface layer contains 0.1 to 10 parts by mass of an ultraviolet absorber with respect to 100 parts by mass of a resin component.

5. The fluorine-based resin multilayer film for vacuum forming according to claim 4, wherein the ultraviolet absorber is one or more selected from triazine compounds and benzotriazole compounds.

6. The fluorine-based resin multilayer film for vacuum forming according to claim 1, wherein a thickness of the front surface layer is 5 to 100 μm and a thickness of the back surface layer is 5 to 300 μm.

7. The fluorine-based resin multilayer film for vacuum forming according to claim 1, wherein a haze measured based on JIS K7136 is less than 10%.

8. A method for manufacturing the fluorine-based resin multilayer film for vacuum forming according to claim 1 by a T-die method, wherein
   a draft ratio defined by a value obtained by dividing a lip opening representing a width of a lip gap of a T-die by a film thickness is 4 to 35,
   a surface temperature of a first cooling roll, with which a resin extruded from the T-die is contacted and cooled, is 20 to 90° C., and
   a draw ratio defined by a value obtained by dividing a film winding speed by a rotation speed of the first cooling roll is 1.05 to 1.30.

9. A decorative film for vacuum forming comprising an adhesive layer, a decorative base material, and the fluorine-based resin multilayer film for vacuum forming according to claim 1.

10. The decorative film for vacuum forming according to claim 9, wherein the decorative base material is at least one resin selected from the group consisting of a polyvinyl chloride resin, an ABS resin, a polycarbonate resin, and a styrenic elastomer.

11. A method for manufacturing an automobile component or an electric appliance component, comprising application of a three-dimensional surface decoration method to a core material using the decorative film for vacuum forming according to claim 9.

12. An automobile component or an electric appliance component manufactured by the manufacturing method according to claim 11.

\* \* \* \* \*